3,324,627
PROCESS FOR THE PURIFICATION OF GASES
Hans-Ulrich Kohrt, Bad Homburg vor der Hohe, Germany, assignor to Metallgesellschaft Aktiengesellschaft, Frankfurt am Main, Germany
Filed Mar. 14, 1962, Ser. No. 179,566
Claims priority, application Germany, Mar. 18, 1961, M 48,445
8 Claims. (Cl. 55—32)

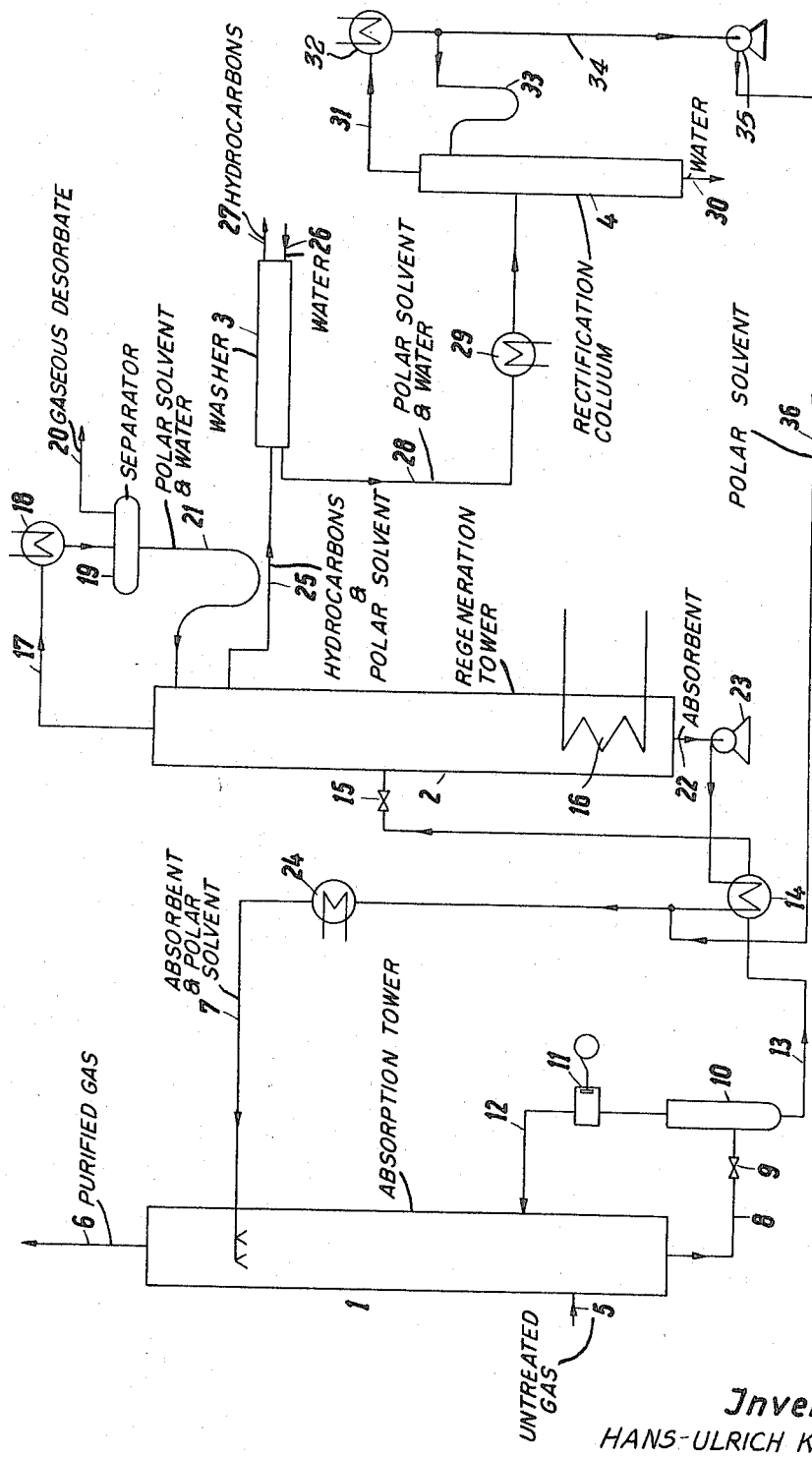

The present invention relates to a process for purifying, by washing, gases accumulating during the refining or conversion of fuels, more particularly, to the washing of such gases with an organic water-soluble absorbent containing nitrogen and oxygen such as N-alkylated pyrrolidones or piperidones.

Pyrrolidones and piperidones are lactams of the $\gamma$- and $\delta$-amino acids derived from butyric acid, valeric acid and caproic acid. Since these substances are cyclic acid amides, they are neutral and therefore act as physically dissolving absorbents. These substances are characterized by having a distinctly selective absorption power for hydrogen sulfide and organic sulfur compounds before absorbing carbon dioxide and hydrocarbons. Since these substances are water-soluble, they will also absorb any water vapor contained in the gases treated thereby.

It is known to use such substances in the purification of gases in such a manner that all impurities, such as hydrogen sulfide, organic sulfur compounds, carbon dioxide, light gasoline ranging from $C_8$ and higher, and water vapor are jointly washed out from the gases to be purified. Further, these impurities can be individually recovered from the desorbate or desorbing agent resulting from the regeneration of the charged absorbent.

However, in order to effectively utilize the high selectivity of these substances with respect to acid gaseous compounds, the gas-washing processes utilizing these substances as absorbents are preferably carried out in several stages. In the first stage, hydrogen sulfides and organic sulfur compounds are washed out from the gases. In one or several of the subsequent stages, carbon dioxide and hydrocarbons are washed out either separately or jointly.

The carbon dioxide can be recovered in a manner known per se by utilizing washing solutions having an alkaline effect and the hydrocarbons by means of an oil-washing or by adsorption using active carbon. However, the carbon dioxide can also be washed out in a similar known manner by means of methanol or of an organic polar washing agent or detergent such as, for instance, acetone, either together with the hydrocarbons or separately therefrom.

In many applications the hydrogen sulfide and the organic sulfur compounds as well as the carbon dioxide are washed out with N-alkylated pyrrolidones or piperidones in two completely separated stages with each stage being provided with its own regenerating apparatus and washing agent circulation.

As is usually done with physically dissolving substances, the regeneration of these absorbents is accomplished by expanding and then subsequently heating and stripping the absorbent with vapor.

It is therefore the principal object of the present invention to provide a novel and improved process for purifying gases such as resulting during the refining or conversion of fuels by washing out various impurities including hydrogen sulfide, organic sulfur compounds, carbon dioxide, hydrocarbons and water vapor under pressure by using as an absorbent N-methylated pyrrolidones or piperidones which may also contain 1 to 2 C-atoms in side chains.

In the process of the present invention a low-boiling organic, polar, water-soluble solution, such as methanol, ethanol or acetone, is added to the absorbent in quantities ranging from 1 to 50% by volume and preferably from 5 to 20% by volume. It has been discovered that the addition of such a substance to the absorbent results in considerable advantages in both the charging and the regeneration of the absorbent. During the absorption process, during which the absorbent is being charged with the impurities, the removal of the impurities by the absorbent is greatly facilitated since the addition of the water-soluble substance decreases the viscosity of the absorbent and also the temperature necessary for the thermal regeneration of the absorbent. As a result, a great volume of vapor is formed which acts as a propellant.

The N-methylated pyrrolidones and piperidones are mixable with water. Additions of water of less than 10% will improve the selectivity of the pyrrolidones and piperidones for sulfur compounds but will not increase the viscosity which will increase to a maximum regardless of further increases in the water content. Thus, limits are defined for a decrease in the temperature of absorption which, in turn, increases the absorption power of physically dissolving absorbents.

According to the present invention, the addition of low-boiling organic polar substances, particularly methanol, ethanol and acetone, allows for a considerable decrease in the viscosity of the absorbent without impairing in any way its absorption power. This considerably increases the speed at which the impurities are removed from the gases even in the case of low washing temperatures such as lower than 0° C. The operation of the process at low washing temperatures, for example between 0° C. and the ambient temperature, means that when physically dissolving absorbents are used in order to obtain a predetermined purity in the end product, smaller quantities of absorbents can be used. As a result, the dimensions of the apparatus with respect to the absorption stage, the regeneration stage and the heat exchangers can be decreased but the resulting smaller apparatus will still be sufficient for carrying out the process.

This improvement in the exchange of impurities from the gases to the absorbent also favorably affects the regeneration of the charged absorbent, particularly if this regeneration is achieved through expansion.

In thermal regeneration, wherein the charged absorbent is heated and blown out with water vapor, the addition of methanol, ethanol or acetone to the absorbent lowers the boiling temperature thereof. In the sump of the column of the regenerator tower, the temperature is about 100° C. to 110° C. Temperatures which are capable of impairing the qualities of the absorbent are not reached. The vapors of the added substances, i.e. methanol, ethanol or acetone, act as a stripping vapor. Thus, the heat requirement for the thermal regeneration is considerably reduced since the regeneration column can be heated with relatively inexpensive waste heat, such as, for instance, with low-pressure steam.

During the regeneration process, a large proportion of the added substance is evaporated. The methanol, ethanol or acetone together with the desorbing agent pass out through the head of the regeneration column, whereas the N-methylated pyrrolidone or piperidone remains in the sump of the column. The present invention provides for the recovery of this added substance from the desorbate through condensation and adding this recovered substance to the cooled sump product of the regeneration tower prior to recirculation of the same into the head of the washing column. As a result, the same proportion selected for the absorbent is reestablished for each washing step.

The dissolving power of the absorbent with respect to hydrocarbons is increased through the addition of methanol, ethanol or acetone to the N-methylated pyrrolidones or piperidones. As a result, the light gasolines ranging from $C_5$ to approximately $C_8$, if they are at all present in the crude gas, are also dissolved when the hydrogen sulfide and the organic sulfur compounds are washed out.

This simultaneous absorption of hydrocarbons may be carried out subsequently to the washing out of carbon dioxides, particularly in those cases where there is no previous washing step for sulfur compounds. The washing-out of carbon dioxides is preferably carried out at the lower temperature and using a larger quantity of absorbent. During the regeneration process these hydrocarbons are contained as a concentrate in a zone located in approximately the central portion of the regeneration tower. This invention provides for tapping this concentrate as a side product from a lateral outlet and flowing the concentrate into a countercurrent washer. In the washer the added substances are washed out from the hydrocarbons by water. The aqueous additional substance is then rectified in a distilling column and then recirculated with the absorbent together with the recovered additional substance.

The process of the present invention is particularly suited for purifying gases occurring during low temperature carbonization, the coking or gasification of solid fuels, as natural gases, or during the thermal catalytic or oxidizing cracking of petroleum fractions. In general, this invention is useful for purifying a fuel gas or a gaseous precursor thereof.

Other objects and advantages of the present invention will be apparent upon reference to the accompanying description when taken in conjunction with the single drawing which comprises a flow diagram to schematically illustrate the process of this invention.

With reference to the drawing, the installation of apparatus for carrying out the present invention comprises an absorption tower 1, a regeneration tower 2, a countercurrent washer 3, and a rectification column 4. The absorption tower 1 and the regeneration tower 2 both consist of substance-exchange columns known per se and provided with trays.

The gas which is to be purified as introduced into the lower end of the absorption tower 1 through a conduit 5. The treated gas is discharged from the head of the absorption tower 1 through an outlet conduit 6.

An absorbent containing, for example, 80% by volume of N-methylpyrrolidone and 20% by volume of methanol is introduced into the upper end of the absorption tower 1 by a distributor or spray nozzles through a conduit 7 which leads from the regenerator tower 2. The absorbent flows downwardly through the structure in the absorption tower 1 and comes in contact with the gas flowing upwardly therethrough in countercurrent relation therewith. The absorbent charged with impurities during this countercurrent contact with the gas is discharged from the bottom of the absorption tower 1 through a conduit 8 and flows through an expansion valve 9 into an expansion vessel 10. The gases liberated in the expansion vessel 10 through the decrease of pressure therein are compressed by a compressor 11 and returned to the absorption tower 1 through conduit 12.

The partly expanded absorbent is discharged from the expansion vessel 10 through a conduit 13 and then flowed through a heat exchanger 14 and an expansion valve 15 to be introduced into approximately the central portion of the regeneration tower 2. The regeneration tower 2 is provided at its lower end with a steam coil 16 to function as a heating unit in a manner known per se.

The substances absorbed from the gas, together with the methanol, are evaporated in the regeneration tower 2 and escape from the head thereof through a conduit 17 leading to a condenser 18. The methanol and water vapor are precipitated in the condenser. A separator 19 is connected in series with the condenser 18 and the gaseous desorbate escapes from the separator 19 through a conduit 20 for further utilization. The condensate consisting substantially of methanol and water returns from separator 19 through conduit 21 as a return flux into the head of the regeneration column 2.

Pure N-methylpyrrolidone is tapped from the sump of the regeneration column 2 through a conduit 22 and returned into the head of the absorption tower 1 by a pump 23 through the heat exchanger 14 and a cooler 24. The methanol recovered during the regeneration is again admixed to the N-methylpyrrolidone at a suitable point in the conduit 7.

After the absorbent has absorbed hydrocarbons such as light gasoline from the gas which is to be purified, the hydrocarbons are concentrated in a zone in the upper central portion of the regeneration tower 2 and are tapped from that zone as a fraction containing methanol through a side outlet 25. The mixture of methanol and gasoline is flowed into a countercurrent washer 3 within which it is washed with water introduced through conduit 26. The hydrocarbons are then removed through the outlet conduit 27 and the aqueous methanol is removed through a conduit 28 and flowed through a heater 29 into the rectification column 4. Water is tapped from the bottom of the rectification column through conduit 30.

In the head of the rectification column 4, the methanol is vaporized and removed through a conduit 31 to be condensed in a cooler 32. A portion of the condensed methanol is returned as a reflux flow into the head of the rectification column 4 through conduit 33. However, the major portion of the methanol is flowed through conduit 34 to a pump 35 from which it is pumped through conduit 36 into the conduit 7 to be again admixed with the N-methylpyrrolidone.

In the event the gas which is to be purified is free of hydrocarbons, the pure methanol can be tapped as a side product from the regeneration tower 2 through conduit 25 and directly into the conduit 36. Under these circumstances the countercurrent washer 3 and the rectification column 4 can be eliminated.

When the methanol from conduit 36 is admixed to the N-methylpyrrolidone in conduit 7, the initial concentration of the absorbent is reestablished and is then recirculated through the absorption tower 1.

In order to further describe the process of the present invention and to assist in the comprehension thereof, the following specific example is presented for illustrative purposes only and is not to be construed as limiting the invention in any way:

*Example*

The present example specifically demonstrates the application of the present process to the purification of a gas obtained from the gasification of carbon by means of water vapor and oxygen under pressure. The cooled gas from which tars have been removed has the following composition:

| | Percent by volume |
|---|---|
| $H_2S$ | 1 |
| $CO_2$ | 29 |
| $CO$ | 20 |
| $H_2$ | 40 |
| $CH_4$ | 10 |

In addition, the gas contains in vaporous form small quantities of carbon oxysulfide and mercaptans as well as the hydrocarbons which have not been condensed during the cooling, such as light gasoline of the quantity of approximately 5 g./Nm.³ (Nm.³ is an abbreviation of a cubic meter at normal or standard conditions, i.e. 0° C. and 760 mm. Hg pressure). The gas is under a pressure of 25 atmospheres absolute.

The sulfur compounds including hydrogen sulfide are first to be washed out from the gas.

To an initial quantity of 1000 Nm.³ of this gas, 2.8 m.³ of an absorbent is applied which absorbent consists of 85% by volume of N-methylpyrrolidone and 15% by volume of methanol. The washing temperature in the absorption column 1 is maintained at +10° C. by means of the cooler 24.

The purified gas having a residual sulfur content of 1 mg./Nm.³ is discharged from the absorption tower 1 through conduit 6. The charged absorbent is conducted from the absorption tower into the expansion vessel 10. At a decrease in pressure of about 5 atmospheres absolute there escape from the expansion vessel 10 equally absorbed quantities of methane, hydrogen and carbon monoxide as well as small quantities of hydrogen sulfide and carbon dioxide. This expanded gas is raised to the pressure within the absorption tower 1 by means of the compressor 11 and returned into the absorption tower through conduit 12.

The remaining portion of the partly expanded absorbent is then flowed through conduit 13 wherein it is expanded in valve 15 and introduced at atmospheric pressure into the regeneration tower 2. The heating coil 16, which is connected to a suitable source of steam, maintains the sump of the regeneration tower 2 at a temperature of approximately 110° C. The temperature in the head of the column 2 is about 75° C. As a result, a substantial portion of the methanol is contained in the absorbent which is discharged from the head of the column through conduit 17 into the cooler 18. The methanol is completely returned as a reflux flow through conduit 21 into the head of the column 2.

The sulfur compounds and a small portion of the carbon dioxides totalling approximately 62 Nm.³ are removed through conduit 20 from the separator 19. The sulfur concentration of this desorption gas is about 16.4% and is sufficient for further treatment.

After washing out of the sulfur compounds, a second step of this process is conducted in order to wash out the carbonic acid.

The apparatus for achieving this corresponds to that illustrated in the drawing with only the quantity and composition of the absorbent as well as the temperature in the absorption tower being different.

In order to wash out the remaining 25% of carbon dioxide down to a residual concentration of 0.6%, 13.2 m.³ of an absorbent consisting of 70% N-methylpyrrolidone and 30% methanol is used in the absorption tower which has a temperature of 5° C.

Thus it can be seen that the present invention provides an improved process for the purification of gases by washing, parttictularly those gases obtained during the refining or conversion of fuels. The increased efficiency of the absorbent used in the washing of the gases enables a decrease in the size of the apparatus necessary to carry out this process as well as a decrease in the quantity of absorbent required.

It will be understood that this invention is susceptible to further modification and, accordingly, it is desired to comprehend such modifications within this invention as may fall within the scope of the appended claims.

What is claimed as this invention is:

1. In a process of purifying an impure gas selected from the group consisting of a fuel gas and a gaseous precursor of a fuel gas, said impure gas having impurities consisting essentially of hydrogen sulfied, organic sulfur compounds, carbon dioxide, $C_5$–$C_8$ hydrocarbons, and water vapor, said process comprising the step of washing the impure gas under pressure with an absorbent selected from the group consisting of N-alkylated piperidones and N-alkylated pyrrolidones, to remove at least one of said impurities, the improvement which comprises adding to the absorbent 1–50% by volume of a low-boiling polar, organic, water-soluble substance selected from the group consisting of methanol, ethanol, and acetone and thereby decreasing the viscosity of said absorbent, lowering the boiling temperature of said absorbent, and increasing the dissolving power of said absorbent.

2. A process in accordance with claim 1, wherein the low boiling, polar, organic, water-soluble substance is added in a quantity of 5–20% by volume.

3. A process in accordance with claim 1, wherein the impurities are removed from the impure gas in stages, and wherein the low-boiling, polar, water-soluble substance is added to the absorbent in varying quantities in each stage, whereby the selectivity of the absorbent can be modified in each stage.

4. In a process of purifying an impure gas selected from the group consisting of a fuel gas and a gaseous precursor of a fuel gas, said impure gas having impurities consisting essentially of hydrogen sulfide, organic sulfur compounds, carbon dioxide, $C_5$–$C_8$ hydrocarbons and water vapor, said process comprising the step of washing the impure gas under pressure with an absorbent selected from the group consisting of N-alkylated piperidones and N-alkylated pyrrolidones to remove at least one of said impurities, the improvement which comprises the steps of passing the impure gas through an absorbing tower in countercurrent contact with an absorbent consisting essentially of a member of the group consisting of N-alkylated piperidone and N-alkylated pyrrolidone, in combination with 1–50% by volume of a low boiling, polar, organic, water-soluble substance selected from the group consisting of methanol, ethanol and acetone; thermally regenerating the absorbent including evaporating the low boiling, polar, organic, water-soluble substance; condensing said latter substance; and recycling the resultant condensed substance to the absorbent prior to passing the absorbent into the absorbing tower.

5. In a process of purifying an impure gas selected from the group consisting of a fuel gas and gaseous precursor of a fuel gas, said impure gas having impurities consisting essentially of hydrogen sulfide, organic sulfur compounds, carbon dioxide, $C_5$–$C_8$ hydrocarbons and water vapor, said process comprising the step of washing the impure gas under pressure with an absorbent selected from the group consisting of N-alkylated piperidones and N-alkylated pyrrolidones to remove at least one of said impurities, the improvement which comprises the steps of passing the impure gas through an absorbing tower in countercurrent contact with an absorbent consisting essentially of a member of the group consisting of N-alkylated piperidone and N-alkylated pyrrolidone, in combination with 1–50% by volume of a low boiling, polar, organic, water-soluble substance selected from the group consisting of methanol, ethanol and acetone; thermally regenerating the absorbent after discharge from the absorbing tower producing a hot sump product and an overhead evaporated, low boiling polar, organic, water-soluble substance cooling said hot sump product thus producing a cooled sump product, condensing said evaporated substance, and adding the resultant condensate to said cooled sump product to form the absorbent before passing the absorbent into the absorbing tower.

6. A process in accordance with claim 5, further comprising the steps of tapping a side product, during the thermal regeneration, consisting of the $C_5$–$C_8$ hydrocarbons removed from the impure gas and a portion of the low boiling, polar, organic, water-soluble substance; washing the side product with water, separating the $C_5$–$C_8$ hydrocarbon therefrom; rectifying the resultant mixture of the low boiling, polar, organic, water-soluble substance and water to remove the water therefrom, and adding the polar, organic, water-soluble substance to the absorbent prior to passing the absorbent through the absorbing tower.

7. A process of purifying an impure gas selected from the group consisting of a fuel gas and a gaseous precursor of a fuel gas, said impure gas having impurities consisting essentially of hydrogen sulfide, organic sulfur compounds, carbon dioxide, $C_5$–$C_8$ hydrocarbons and water vapor, which process comprises the step of washing the impure gas under pressure with an absorbent consisting essentially of a member of the group consisting of N-alkylated piperidone and N-alkylated pyrrolidone, in combination with 5–20% by volume of a low boiling, polar, organic, water-soluble substance selected from the group consisting of methanol, ethanol and acetone to selectively remove the hydrogen sulfide, organic sulfur compounds, and $C_5$–$C_8$ hydrocarbons in a first stage said combination with 5–20% by volume of a low boiling, polar, organic, water-soluble substance thereby decreasing the viscosity of said absorbent, lowering the boiling temperature of said absorbent and increasing the dissolving power of said absorbent.

8. A process of purifying an impure gas selected from the group consisting of a fuel gas and a gaseous precursor of a fuel gas, said impure gas having impurities consisting essentially of hydrogen sulfide, organic sulfur compounds, carbon dioxide, $C_5$–$C_8$ hydrocarbons and water vapor, which process comprises washing the impure gas with an absorbent consisting essentially of a member of the group consisting of N-alkylated piperidone and N-alkylated pyrrolidone, in combination with 5–20% by volume of a low boiling, polar, water-soluble substance selected from the group consisting of methanol, ethanol, and acetone to primarily remove the hydrogen sulfide, organic sulfur compounds and $C_5$–$C_8$ hydrocarbons and subsequently washing the resultant semi-purified gas with an absorbent consisting essentially of a member of the group consisting of N-alkylated piperidone and N-alkylated pyrrolidone, in combination with 10–50% by volume of a low boiling, polar, water-soluble substance selected from the group consisting of methanol, ethanol and acetone to primarily remove the carbon dioxide said combination with 5–20% by volume of a low boiling, polar, organic, water-soluble substance and said combination with 10–50% by volume of a low boiling, polar, water-soluble substance thereby decreasing the viscosity of said absorbent, lowering the boiling temperature of said absorbent and increasing the dissolving power of said absorbent.

References Cited

UNITED STATES PATENTS

| | | | |
|---|---|---|---|
| 2,753,012 | 7/1956 | Thodos et al. | 55—48 |
| 2,805,733 | 9/1957 | Stanton | 55—46 X |
| 2,863,527 | 12/1958 | Herbert et al. | 55—73 |
| 2,868,327 | 1/1959 | Rotzler et al. | 55—46 X |
| 2,880,591 | 4/1959 | Kwauk | 55—48 X |
| 3,001,608 | 9/1961 | Lorenz et al. | 55—46 X |

FOREIGN PATENTS

| | | |
|---|---|---|
| 728,444 | 4/1955 | Great Britain. |
| 750,399 | 6/1956 | Great Britain. |

REUBEN FREIDMAN, *Primary Examiner.*

DENNIS E. TALBERT, *Assistant Examiner.*